(12) United States Patent
Pai

(10) Patent No.: US 8,073,113 B2
(45) Date of Patent: Dec. 6, 2011

(54) MARKING VOICE MESSAGES AS HEARD

(75) Inventor: Samarth Sharath Pai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 517 days.

(21) Appl. No.: 12/276,412

(22) Filed: Nov. 23, 2008

(65) Prior Publication Data

US 2010/0128856 A1    May 27, 2010

(51) Int. Cl.
*H04M 1/64* (2006.01)
(52) U.S. Cl. ............... 379/88.12; 379/88.14; 379/88.17; 379/88.25
(58) Field of Classification Search ............... 379/88.12, 379/88.25
See application file for complete search history.

(56) References Cited

U.S. PATENT DOCUMENTS

| | | | | |
|---|---|---|---|---|
| 6,085,231 | A * | 7/2000 | Agraharam et al. | 709/206 |
| 6,618,763 | B1 * | 9/2003 | Steinberg | 709/246 |
| 6,683,940 | B2 * | 1/2004 | Contractor | 379/88.17 |
| 6,842,772 | B1 * | 1/2005 | Delaney et al. | 709/206 |
| 6,999,469 | B1 | 2/2006 | Chu et al. | |
| 6,999,566 | B1 | 2/2006 | Eason et al. | |
| 7,286,650 | B2 | 10/2007 | Pantana et al. | |
| 2005/0058260 | A1 * | 3/2005 | Lasensky et al. | 379/1.03 |
| 2006/0234680 | A1 | 10/2006 | Doulton | |
| 2008/0123823 | A1 | 5/2008 | Pirzada et al. | |
| 2008/0207176 | A1 | 8/2008 | Brackbill et al. | |

OTHER PUBLICATIONS

"Vonage Visual Voicemail", Retrieved on Oct. 13, 2008, Webpage available at:- http://www.vonage.com/features.php?feature=vonage_visual_voicemail&refer_id=WEBFE070501001W1.
"ShoreTel Voice Mail Quick Reference", Retrieved on Oct. 13, 2008, Webpage available at :- http://support.shoretel.com/products/ip_phones/downloads/vm_qrc.pdf.
"Voicemail—Unified Messaging", Retrieved on Oct. 13, 2008, Webpage available at :- http://www.it.utah.edu/services/phones/coral/unified_msg.html.

* cited by examiner

*Primary Examiner* — Simon Sing
(74) *Attorney, Agent, or Firm* — Hope Baldauff Hartman, LLC

(57) ABSTRACT

In response to receiving a voice message, a telephony service creates an e-mail message directed to the intended recipient of the voice message. The e-mail message includes the voice message as an attachment and an embedded image file. Once the e-mail message has been created, a mail system is utilized to transmit the e-mail message to the intended recipient of the voice message. An e-mail client application program may be used to retrieve the e-mail message and to view the message content. In order to render the message content, the e-mail client application program will transmit a request for the image file. In response to receiving the request for the image file, an indication is transmitted to the telephony service indicating that the intended recipient has heard the voice message. In response to receiving the indication, the telephony service marks the voice message as heard.

20 Claims, 4 Drawing Sheets

MARKING VOICE MESSAGES AS HEARD

BACKGROUND

Modern telephone systems often support functionality for forwarding voice messages, also referred to herein as voicemail messages, to an electronic mail ("e-mail") account. When a new voicemail message is received, an e-mail message is transmitted to the intended recipient of the voicemail that includes the voicemail as an attachment. The intended recipient can utilize an e-mail client application to receive the e-mail and to play back the attached voicemail message.

One difficulty with current phone systems capable of forwarding voice messages to e-mail accounts is that these phone systems have no way of knowing that a forwarded voicemail message has been heard by the intended recipient. As a result, users of these types of phone systems will often be presented with other notifications that a new voicemail message has been received even after they have heard a voicemail message.

For instance, a user may listen to a voicemail forwarded in an e-mail message and then return home to find a light flashing on her telephone indicating that a new message has been received. When the user checks her voicemail she finds that the "unheard" voicemail was, in fact, the one that she already listened to via the forwarded e-mail message. This can be very annoying for a telephone system user.

It is with respect to these considerations and others that the disclosure made herein is presented.

SUMMARY

Technologies are described herein for marking voice messages as having been heard. In particular, through the utilization of the concepts and technologies presented herein, information regarding the delivery status of an e-mail message having a voicemail message attached thereto can be received and utilized to mark the voicemail message has having been heard by the intended recipient. Once the voicemail message has been heard, notifications directed to the intended recipient that indicate that a new voice message has been received can be removed. As a result, users will no longer be bothered by new message notifications after they have opened an e-mail message having a voicemail attached thereto.

In one implementation, a voice message is received at a telephony service. In response to receiving the voice message, an e-mail message is created for transmission to the intended recipient of the voice message. The e-mail message includes the voice message attached thereto as an attachment. In one embodiment, the content of the e-mail message is formatted using a markup language, such as the hypertext markup language ("HTML"), and includes an embedded image file. The embedded image file may be a transparent image that is no larger than one pixel by one pixel. The image file may be stored at a World Wide Web ("Web") service and made available via a public network such as the Internet.

Once the e-mail message has been created, a mail system is utilized to transmit the e-mail message to the intended recipient of the voice message. The intended recipient may utilize an e-mail client application program executing on, for instance, a desktop computer, a laptop computer, or a mobile telephone, to retrieve the e-mail message and to view the message content. In order to render the message content, the e-mail client application program will transmit a request for the embedded image file to the Web service.

In response to receiving the request for the embedded image file, the Web service will transmit an indication to the telephony service indicating that the intended recipient has heard the voice message. In response to receiving the indication, the telephony service will mark the voice message as heard. For instance, a flag may be set that indicates that the intended recipient has heard the voice message. Additionally, the telephony service will remove any notifications directed to the intended recipient that indicate that a new voice message has been received. For instance, a flashing light on a telephone associated with the intended recipient will be extinguished.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
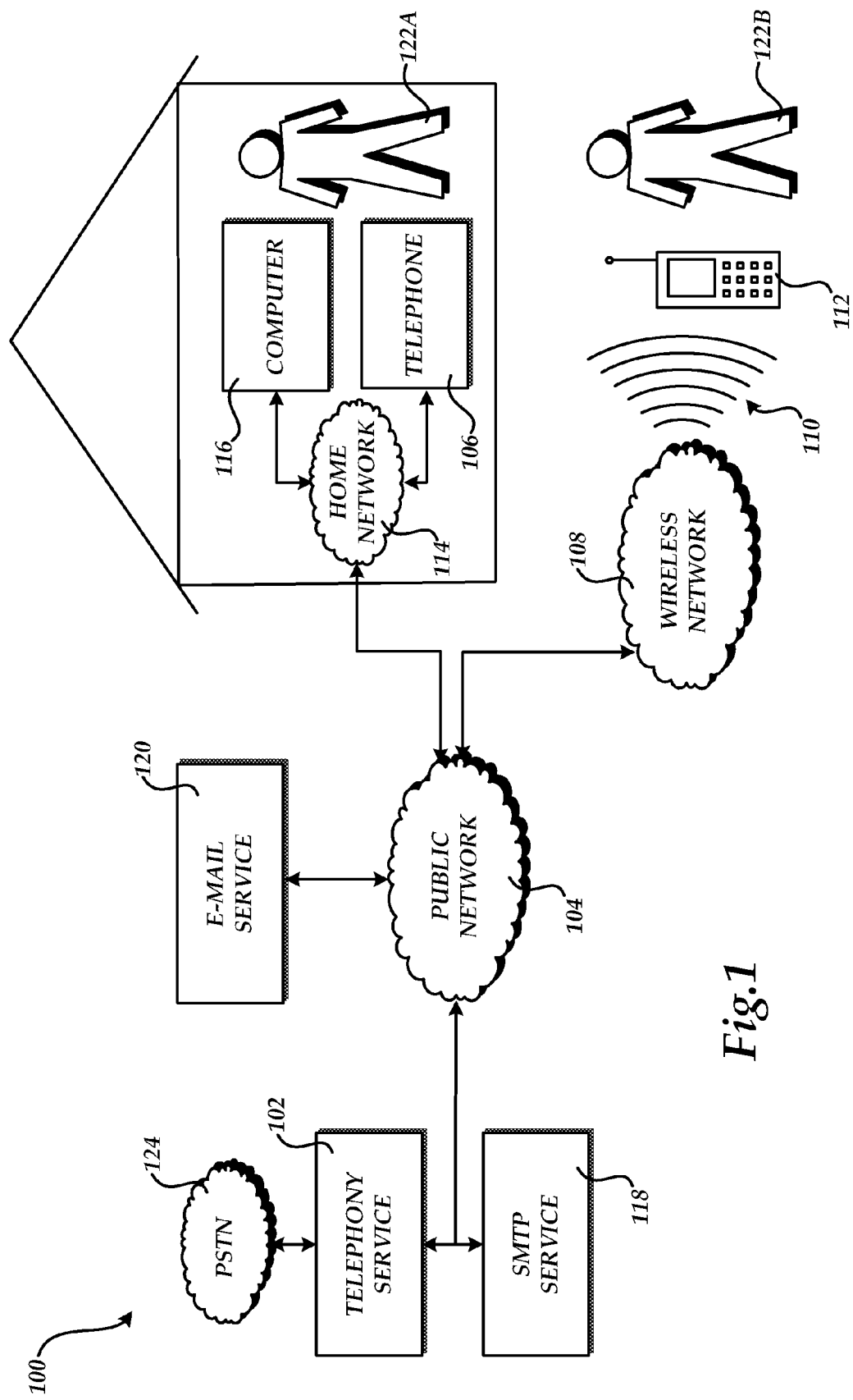
FIG. 1 is a network diagram showing one operating environment for embodiments presented herein.

The following detailed description is directed to concepts and technologies for marking voice messages as heard. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks, implement particular abstract data types, and transform data. Moreover, those skilled in the art will appreciate that the subject matter described herein may be practiced with or tied to other specific computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, technologies for marking voice messages as having been heard will be described.

Referring now to FIG. 1, aspects of a system 100 that forms an operating environment for embodiments presented herein will be described. As shown in FIG. 1, the system 100 includes a telephony service 102. According to embodiments, the telephony service 102 comprises a Voice Over Internet Protocol ("VoIP") telephony service that allows telephone calls to be sent and received over the Internet or other packet-switched network. Other terms frequently encountered and synonymous with VoIP telephony systems are IP telephony and Internet telephony, as well as voice over broadband, broad band telephony, and broadband phone.

As shown in FIG. 1, the telephony service 102 may utilize a public data network 104 to permit the sending and receiving of telephone calls. The telephony service 102 may also interface with the public switched telephone network 124 ("PSTN") to allow for transparent phone communications worldwide. VoIP telephony systems carry telephony speech as digital audio typically reduced in data rate using speech data compression techniques, packetized, and encapsulated in a package stream over the internet protocol.

As shown in FIG. 1, a telephone 106 may connect to the public network 104 through a home network 114, or other type of local area network, to allow a user 122A to make and receive telephone calls through the telephony service 102. Calls may also be made and received through a computer 116, also connected to the home network 114 and the public network 104.

A user 122B may also be permitted to make and receive telephone calls through the telephony service 102 through a wireless mobile telephone 112 connected to the wireless network 108. As shown in FIG. 1, the wireless telephone 112 connects to the wireless network 108 through a wireless signal 110. The wireless network 108 is, in turn, connected to the public network 104 through an appropriate data connection. In this manner, the user 122B can utilize the wireless telephone 112 to make and receive telephone calls through the telephony service 102.

According to one implementation, the telephony service 102 includes functionality for recording voice messages. For instance, if the user 122A makes a phone call to the user 122B and the user 122B is unavailable, the telephony service 102 will allow the user 122A to record a voice message for later retrieval by the user 122B. Such voice messages may be stored at the telephony service 102 or in another location accessible to the user 122B.

In one implementation presented herein, the telephony service 102 also permits a user to specify that received voice messages be forwarded to them via e-mail. In this regard, a user may specify one or more e-mail addresses to which voicemail messages should be forwarded. In order to implement this functionality, the telephony service 102 utilizes a mail server, such as the Simple Mail Transfer Protocol ("SMTP") service 118. The SMTP service 118 is utilized to transmit e-mail messages containing voicemails to a user. In the example shown in FIG. 1, the user 122A utilizes a third party e-mail service 120 to send and receive e-mail. In this implementation, the telephony service may utilize the SMTP service 118 to transmit a message to the user 122A including a voicemail message. This message will be received and stored by the e-mail service 120.

The user 122A may utilize the computer 116 to retrieve e-mail messages from the e-mail service 120. In response to receiving an e-mail message from the telephony service 102 that includes a voice message, the user 122A may play back the voicemail message at the computer 116. Similarly, a user 122B may receive and play back voicemail messages attached to an e-mail message utilizing the wireless mobile telephone 122 in a similar manner.

According to embodiments, the telephony service 102 may also communicate with a telephone 106 to provide a notification to a user 122A that a new voicemail message has been received. For instance, the telephone 106 may include a visual indicator (not shown) that is illuminated when the telephony service 102 receives a new voicemail message for the user 122A. The user 122A may utilize the telephone 106 to retrieve the new voicemail message from the telephony service 102 or may utilize the computer 116 to retrieve the message in the manner described above.

As discussed briefly above, current telephony services that are capable of forwarding voice messages to e-mail accounts are unable to receive information indicating that a forwarded voicemail message has been heard by the intended recipient. As a result, users of these types of phone systems will often be presented with other notifications that a new voicemail message has been received even after they have heard a voicemail message. For instance, if the user 122A utilizes the computer 116 to listen to a voicemail message attached to an e-mail, the telephony service 102 will be unaware that the voicemail message has been heard. As a result, an indication on the telephone 106 for indicating that a new voicemail has been received will continue to be illuminated even after the voicemail message has been heard. As result, the user 122A must access the telephony service 102 utilizing the telephone 106 to review the new voicemail message again or otherwise mark the voicemail message as heard in order to the clear the notification. The embodiments presented herein address this difficulty by providing information from the computer 116 to the telephony service 102 when an e-mail message forwarded from the telephony service 102 has been opened by the user 122A. Details regarding this process are provided below with respect to FIGS. 2-4.

It should be appreciated that while the telephony service 102 shown in FIG. 1 is described herein as a VoIP telephony service, other types of telephony services may be utilized with the embodiments presented herein. In particular, any telephony service that provides functionality for forwarding a voice message to a user via electronic mail or other type of messaging service may be utilized with the embodiments presented herein. It should be appreciated that the implementations described herein are not limited to any particular type of telephony service 102 other than a service that is capable of forwarding voicemail messages to its users.

Figure 2:
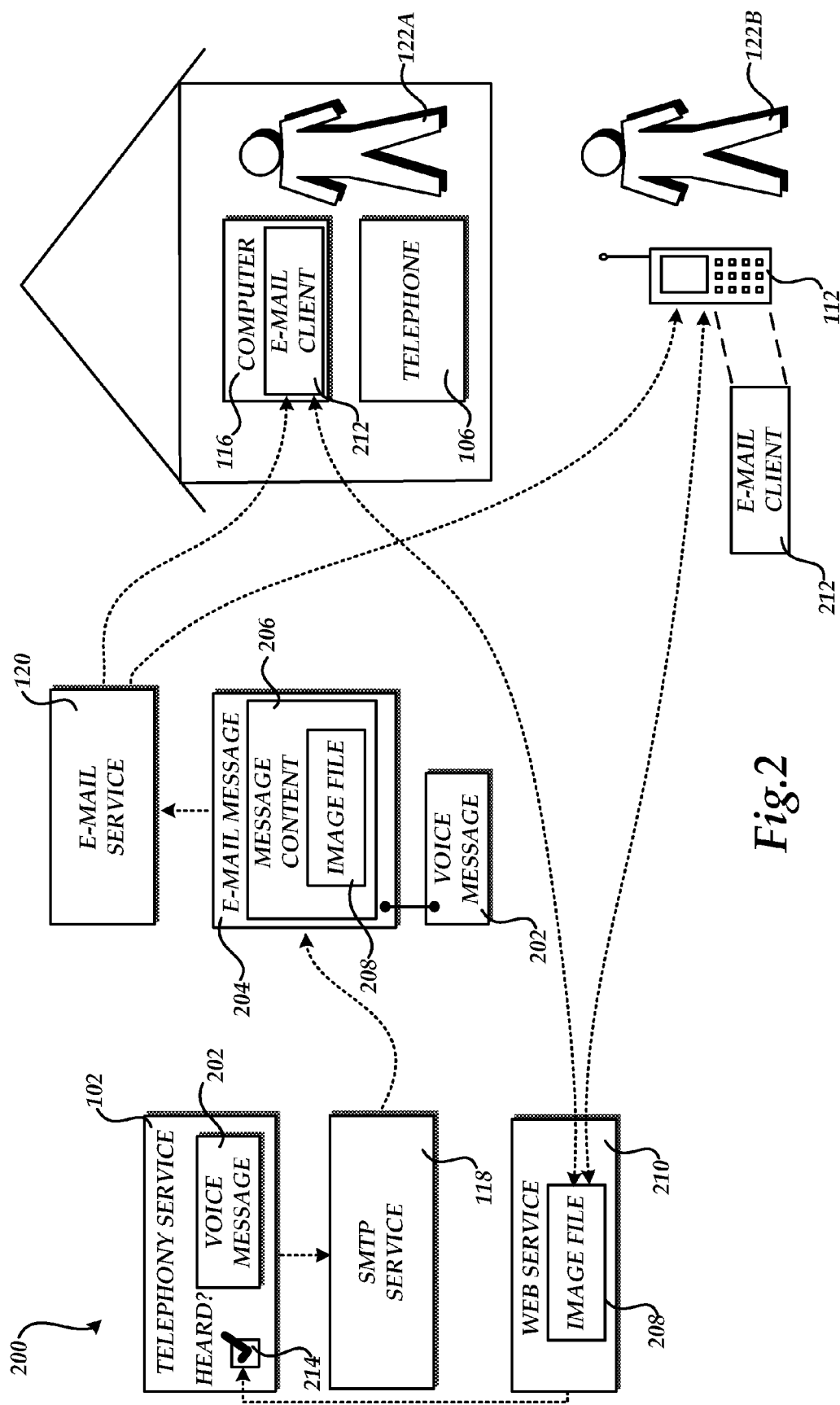
FIG. 2 is functional block diagram illustrating aspects of the operation of several software components provided herein in embodiments.

Referring now to FIG. 2, details regarding a system 200 provided in one embodiment for marking e-mail messages will be described. As shown in FIG. 2, the system 200 includes a telephony service 102 that may be configured to forward a voice message 202 to a user 122A or 122B. As discussed above, the telephony service 102 may utilize the services of an SMTP service 118 or other type of mail server in order to transmit an e-mail message with the voicemail message 202 attached thereto.

When the telephony service 102 receives a new voice message 202 directed to an intended recipient, such as the user 122A or the user 122B, the telephony service 102 creates a new e-mail message 204. The e-mail message 204 is directed to the intended recipient and includes the voice message 202 attached thereto as an attachment. According to one embodiment, the e-mail message 204 also includes message content 206. The message content 206 includes an embedded file, such as the image file 208. According to one embodiment, the message content 206 is formatted using a markup language, such as HTML. In this embodiment, an appropriate HTML tag is utilized to embed the image file 208 into the message content 206.

According to one embodiment, the image file 108 is a unique file that is associated with the voice message 202. The image file 208 is stored at a Web service 210 that is accessible via the Internet or other type of public network. As will be described in greater detail below, the image file 208 allows the telephony service 102 to recognize when the e-mail message 204 has been opened by the intended recipient. This information is utilized to mark the voice message 202 as having been heard by the intended recipient.

Once the telephony service 102 has created the e-mail message 204, the SMTP service 118 is utilized to transmit the e-mail message 204 to the e-mail service 120 utilized by the intended recipient. The intended recipient may then utilize a desktop or laptop computer 116 capable of executing an electronic mail client application program 212 to retrieve the e-mail message 204. It should be appreciated that other types of devices capable of executing an electronic mail client application program 212, such as the wireless telephone 112, may be utilized to retrieve the e-mail message 204. It should also be appreciated that other types of application programs may be configured to retrieve the e-mail message 204. For instance, certain types of e-mail services permit Web browsers to access a website through which electronic mail messages may be sent and received.

In the example shown in FIG. 2, the user 122A utilizes the computer 116 to execute the e-mail client application program 212. Through the e-mail client application program 212, the e-mail message 204 may be retrieved from the e-mail service 120. When the e-mail client application program 212 retrieves the e-mail message 204, it attempts to render the message content 206. During the rendering process, the e-mail client application program 212 will transmit a request to the Web service 210 for the image file 208. A similar process will be performed if the user 122B utilizes the wireless telephone 112 to retrieve an e-mail message 204.

In response to receiving the request from the e-mail client application program 212 for the image file 208, the Web service 210 transmits an indication to the telephony service 102 indicating that the voice message 202 has been heard by the intended recipient. In response thereto, the telephony service 102 marks the voice message 202 as having been heard. For instance, according to one embodiment, the telephony service 102 may set a flag 214 indicating that the voice message has been heard by the intended recipient. Additionally, the telephony service 102 may remove any notifications directed to the intended recipient that indicate that a new voice message has been received. For instance, if a visible or audible indicator has been activated at the telephone 106, this notification may be removed in response to the setting of the flag 214.

According to one embodiment, the image file 208 comprises a one pixel by one pixel graphics interchange format ("GIF") file that is transparent. By utilizing such a file, the image file 208 will not be visible to the user 122A when the message content 206 is rendered by the e-mail client 212. It should be appreciated that while the embodiments contained herein are described in the context of an embedded image file 208 in the message content 206, any type of file may be embedded in the message content 206 that will be requested by the e-mail client 212 during the process of rendering the e-mail message 204. Additional details regarding the process illustrated in FIG. 2 will be provided below with reference to FIG. 3.

It should be appreciated that some types of e-mail client applications may be configured to download e-mail attachments, like the voice message 202, and embedded images, like the image file 208, only after a user has given explicit permission for these items to be downloaded. In this case, if the image file 208 is downloaded by the e-mail client application 212 from the Web service 210, there is a higher probability that the user 122A actually listened to the audio voice message 202 attached to the e-mail message 204. As a consequence, it is beneficial for the users 122A-122B to utilize e-mail client applications 212 that require explicit permission prior to downloading e-mail attachments and embedded image files.

Figure 3:
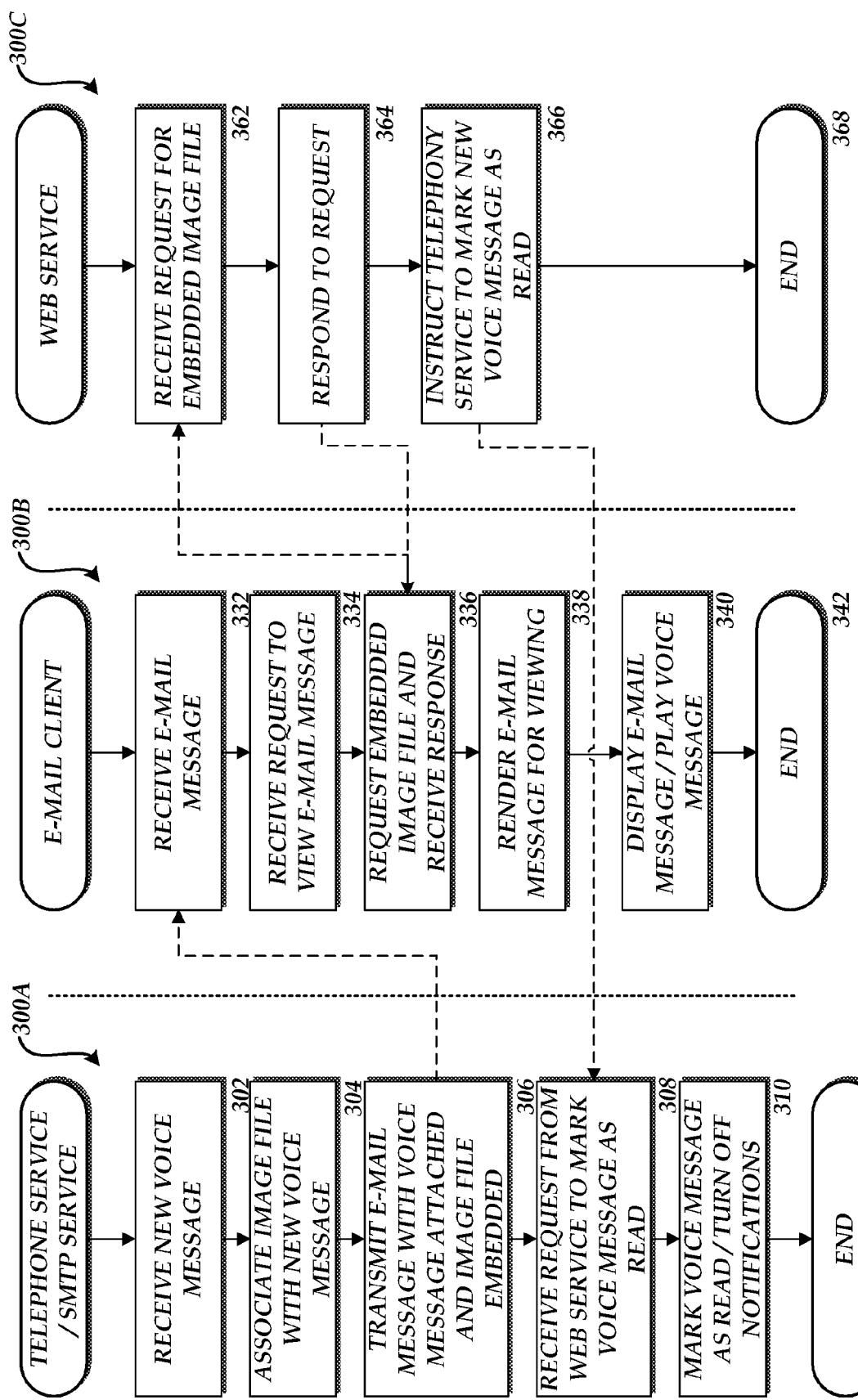
FIG. 3 is a flow diagram showing several routines that illustrate aspects of the operation of several software components provided herein.

Turning now to FIG. 3, additional details will be provided regarding the embodiments presented herein for marking voice messages as heard. In particular, FIG. 3 is a flow diagram showing several routines 300A, 300B, and 300C that together illustrate aspects of the operation of the telephony service 102 and SMTP service 118, the e-mail client application 212, and the Web service 210, respectively.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300A begins at operation 302, where the telephony service 102 receives a new voice message 202. In response to receiving the voice message 202, the routine 300A proceeds to operation 304 where the telephony service 102 creates a new image file 208 and associates the image file 208 with the voice message 202. In this regard, the image file 208 may be given a unique identifier 208 that is associated with the voice message 202.

From operation 304, the routine 300A proceeds to operation 306 where the telephony service 102 creates the e-mail message 204. As discussed above, the voice message 202 is attached to the e-mail message 204. Additionally, message content 206 is created that includes the image file 208 embedded therein. Once the telephony service 102 has created the e-mail message 204, the telephony service 120 utilizes the SMTP service 118 to transmit the e-mail message 204 to the e-mail service 120 associated with the intended recipient.

At operation 332 of the routine 300B, the intended recipient of the e-mail message 204 utilizes the computer 116 or the wireless telephone 112 to receive the e-mail message 204. As discussed above, an appropriate e-mail client application program may be utilized to communicate with the e-mail service 120 and to retrieve the e-mail message 204. Other types of client applications such as a Web browser may also be utilized to retrieve the e-mail message 204 from the e-mail service 120.

From operation 332, the routine 300B proceeds to operation 334 where the e-mail client application program 212 receives a request to view the e-mail message 204. For instance, the user 122A may utilize an appropriate input device to select the e-mail message 204 in an e-mail inbox. In response to receiving a request to view the e-mail message, the routine 300B proceeds from operation 334 to operation 336. At operation 336, the e-mail client application program 212 requests the embedded image file 208 from the Web service 210. The e-mail client application program 212 may also request any other content embedded in the e-mail message 204 from the Web service 210 or from another Web server computer.

The Web service 210 receives the request from the e-mail client 212 for the image file 208 at operation 362 of the routine 300C. In response to receiving the request, the Web service 210 responds to the request at operation 364 by providing the image file 208 to the e-mail client 212. At discussed above, the image file 208 comprises a one pixel by one pixel transparent image file that will not be visible to the user when the e-mail message 204 is rendered.

From operation 364, the routine 300C proceeds to operation 366 where the Web service 210 provides an instruction to the telephony service 210 to mark the voice message 202 as having been heard by the intended recipient. This request is received by the telephony service 102 at operation 308 of the routine 300A, which is described in greater detail below. From operation 366, the routine 300C proceeds to operation 368, where it ends.

The routine 300B proceeds from operation 336 to operation 338 in response to receiving the image file 208 from the Web service 210. At operation 338, the e-mail client 212 renders the e-mail massage 204 for viewing by the intended recipient. Once the e-mail message 204 has been rendered, the routine 300B proceeds to operation 340 where the e-mail message 204 is displayed to the intended recipient. Additionally, the e-mail client 212 may provide functionality or utilize an external program that allows the intended recipient to play back the audio of the voice message 202 attached to the e-mail message 204. From operation 340, the routine 300B proceeds to operation 342, where it ends.

At operation 308 of the routine 300A, the telephony service 102 receives the request from the Web service 210 to mark the voice message 202 as having been heard by the intended recipient. As discussed briefly above, the telephony service 102 may set a flag 214 or another type of data structure that indicates that the voice message 202 has been heard by the intended recipient. As also discussed briefly above, the telephony service 102 may remove any notifications that have been directed to the intended recipient of the voice message 202 that a new voice message has been received. For instance, any audible or visual indicators provided by the telephone 106 or other devices in an attempt to notify the intended recipient of the voice message 202 that a new voice message has been received may be discontinued. From operation 310, the routine 300A proceeds to operation 312, where it ends.

It should be appreciated that the computer systems and network connections illustrated in FIGS. 1 and 2 have been simplified. For instance, the telephony service 102 may comprise many disparate and homogenous computing systems configured to provide the functionality described herein. Additionally, the Web service 210 may comprise many different computing systems configured to receive and respond to requests for files stored thereupon, such as the image file 208. Additionally, the SMTP service 118 and e-mail service 120 provide a simplified view of the process of sending an e-mail message 204 from the server computer to a user. Many more computing systems and network connections may be utilized to implement the embodiments presented herein.

Figure 4:
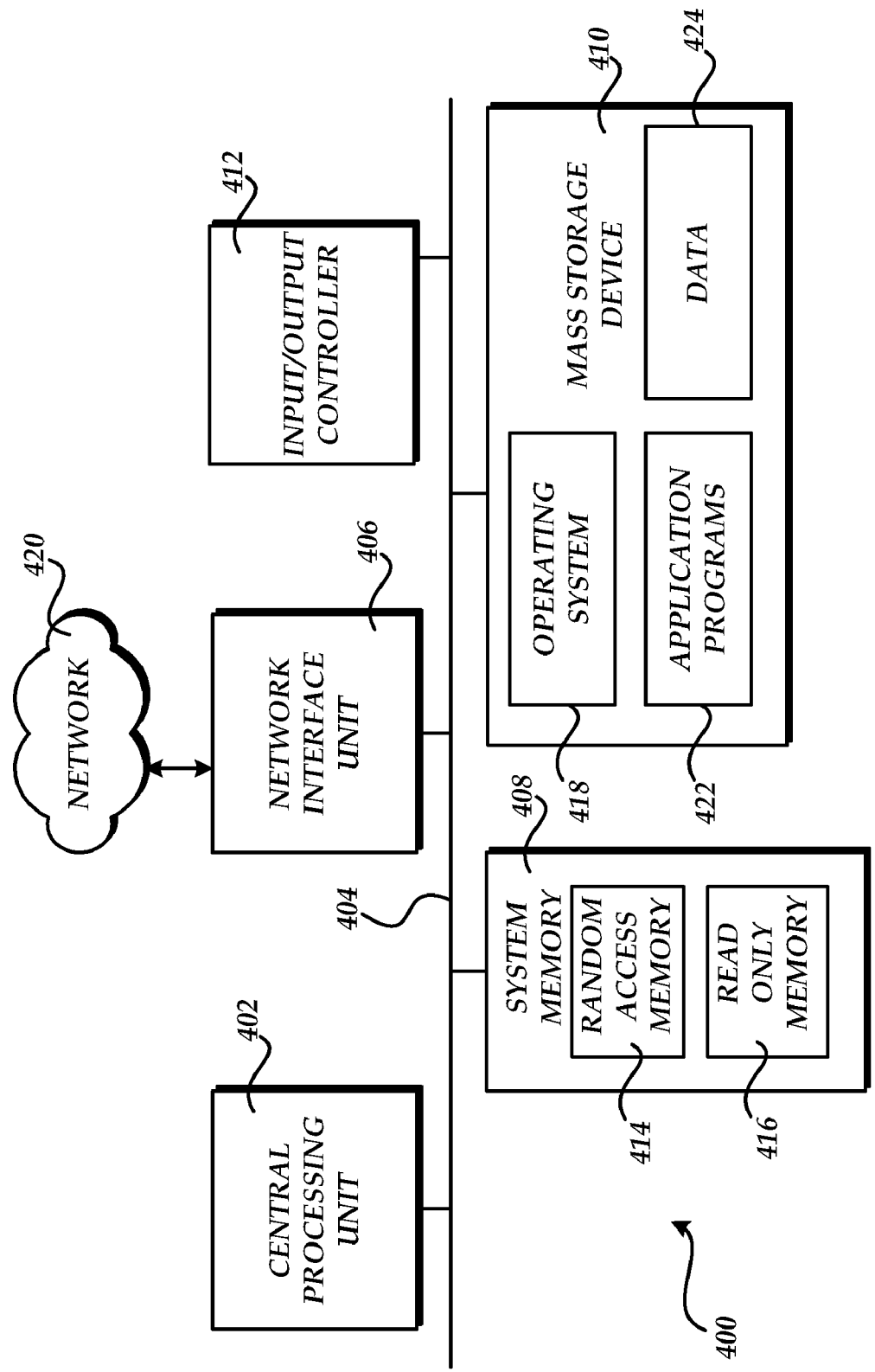
FIG. 4 is a computer architecture diagram showing an illustrative computer hardware and software architecture for a computing system capable of implementing aspects of the embodiments presented herein.

FIG. 4 shows an illustrative computer architecture for a computer 400 capable of executing the software components described herein. The computer architecture shown in FIG. 4 illustrates a conventional desktop, laptop, mobile, or server computer and may be utilized to embody the telephony service 102, the SMTP service 118, the e-mail service 120, the computer 116, and the wireless telephone 112, described above.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 418, application programs, and other program modules, which have been described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 420. The computer 400 may connect to the network 420 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, a microphone, a mouse, or an electronic stylus. Similarly, an input/output controller may provide output to a display screen, a printer, a speaker, or other type of output device.

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store programs for performing the processes described herein, such as application programs 422, and data 424.

Based on the foregoing, it should be appreciated that technologies for marking voice messages as heard are provided herein. Although the subject matter presented herein has been described in language specific to computer structural features, methodological acts that include transformations, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for marking a voice message as having been heard by an intended recipient, the method comprising:
   receiving the voice message at a telephony service;
   in response to receiving the voice message, transmitting an electronic mail (e-mail) message with the voice message attached thereto, the electronic mail message comprising message content including an embedded file;
   receiving a request for the file embedded in the message; and
   in response to the request for the file, marking the voice message as having been heard at the telephony service.

2. The method of claim 1, wherein the file comprises an image file.

3. The method of claim 2, wherein the message content is expressed utilizing a markup language.

4. The method of claim 3, wherein the markup language comprises the hypertext markup language (HTML).

5. The method of claim 4, wherein the request for the file embedded in the message is received from an e-mail client application program.

6. The method of claim 5, wherein the e-mail client application program is executing on a desktop or laptop personal computer.

7. The method of claim 5, wherein the e-mail client application program is executing on a wireless telephone.

8. The method of claim 5, wherein marking the voice message as having been heard comprises setting a flag indicating that the voice message has been heard and removing one or more notifications directed to the intended recipient that indicate that a new voice message has been received.

9. The method of claim 8, wherein the request for the file embedded in the e-mail message is received at a World Wide Web (Web) service, and wherein the Web service is configured to transmit a notification to the telephony service indicating that the request for the file embedded in the message has been received.

10. A computer-readable medium having computer-executable instructions stored thereon which, when executed by a computer, cause the computer to:
   receive a voice message;
   in response to receiving the voice message, to transmit a message to an intended recipient of the voice message, the message comprising the voice message and an embedded file;
   receive a request for the file; and
   in response to receiving the request for the file, to mark the voice message as having been heard by the intended recipient.

11. The computer-readable medium of claim 10, wherein the message comprises an electronic mail (e-mail) message.

12. The computer-readable medium of claim 11, wherein the file comprises an image file.

13. The computer-readable medium of claim 12, wherein the e-mail message comprises message content expressed using a markup language.

14. The computer-readable medium of claim 13, wherein marking the voice message as having been heard comprises setting a flag indicating that the voice message has been heard and removing one or more notifications directed to the intended recipient that indicate that a new voice message has been received.

15. The computer-readable medium of claim 14, wherein the request for the file is received from an e-mail client application program.

16. A system for marking a voice message as having been heard by an intended recipient, the system comprising:
   a telephony service computer configured to receive a voice message, to generate an electronic mail (e-mail) message with the voice message attached thereto and having message content expressed using a markup language that includes an embedded image file, and to transmit the e-mail message to an intended recipient through a mail service; and
   a World Wide Web (Web) service computer configured to receive a request for the image file embedded in the message from an e-mail client application program and, in response to receiving the request for the image file, to transmit an indication to the telephony service indicating that the voice message has been heard.

17. The system of claim 16, wherein the telephony service computer is further configured to receive the indication and, in response thereto, to set a flag indicating that the voice message has been heard and to remove one or more notifications directed to the intended recipient that indicate that a new voice message has been received.

18. The system of claim 17, wherein the request for the file embedded in the message is received from an e-mail client application program.

19. The system of claim 18, wherein the e-mail client application program is executing on a desktop or laptop personal computer.

20. The system of claim 18, wherein the e-mail client application program is executing on a wireless telephone.

* * * * *

UNITED STATES PATENT AND TRADEMARK OFFICE
CERTIFICATE OF CORRECTION

PATENT NO. : 8,073,113 B2  
APPLICATION NO. : 12/276412  
DATED : December 6, 2011  
INVENTOR(S) : Samarth Sharath Pai Page 1 of 1

It is certified that error appears in the above-identified patent and that said Letters Patent is hereby corrected as shown below:

In column 10, line 39, in Claim 16, after "service" insert -- computer --.

Signed and Sealed this
Thirty-first Day of January, 2012

David J. Kappos
*Director of the United States Patent and Trademark Office*